(12) United States Patent
Blechschmidt et al.

(10) Patent No.: US 11,783,558 B1
(45) Date of Patent: Oct. 10, 2023

(54) OBJECT CORRECTION USING SCENE GRAPHS

(71) Applicant: Apple Inc., Cupertino, CA (US)

(72) Inventors: Angela Blechschmidt, San Jose, CA (US); Daniel Ulbricht, Sunnyvale, CA (US); Alexander S. Polichroniadis, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 17/678,544

(22) Filed: Feb. 23, 2022

Related U.S. Application Data

(60) Provisional application No. 63/152,897, filed on Feb. 24, 2021.

(51) Int. Cl.
  *G06T 19/20* (2011.01)
  *G06T 17/00* (2006.01)
  *G06V 20/70* (2022.01)
  *G06T 7/70* (2017.01)

(52) U.S. Cl.
  CPC .............. *G06T 19/20* (2013.01); *G06T 7/70* (2017.01); *G06T 17/00* (2013.01); *G06V 20/70* (2022.01); *G06T 2207/10028* (2013.01); *G06T 2210/61* (2013.01); *G06T 2219/2004* (2013.01)

(58) Field of Classification Search
  None
  See application file for complete search history.

(56) References Cited

U.S. PATENT DOCUMENTS

| | | |
|---|---|---|
| 10,607,105 B1 | 3/2020 | Papon et al. |
| 10,853,398 B2 | 12/2020 | Fisher |
| 2020/0036816 A1 | 1/2020 | Babu J D et al. |
| 2020/0050871 A1 | 5/2020 | Block |
| 2020/0401835 A1* | 12/2020 | Zhao .................... G06V 10/426 |
| 2022/0129228 A1* | 4/2022 | Babb ...................... G06F 3/147 |

OTHER PUBLICATIONS

U.S. Patent and Trademark Office, Notice of Allowance, U.S. Appl. No. 17/678,629, 10 pages, dated Jul. 24, 2023.

* cited by examiner

*Primary Examiner* — Kee M Tung
*Assistant Examiner* — Jed-Justin Imperial
(74) *Attorney, Agent, or Firm* — Thompson Hine LLP

(57) ABSTRACT

Various implementations disclosed herein include devices, systems, and methods that uses object relationships represented in the scene graph to adjust the position of objects. For example, an example process may include obtaining a three-dimensional (3D) representation of a physical environment that was generated based on sensor data obtained during a scanning process, detecting positions of a set of objects in the physical environment based on the 3D representation, generating a scene graph for the 3D representation of the physical environment based on the detected positions of the set of objects, wherein the scene graph represents the set of objects and relationships between the objects, and determining a refined 3D representation of the physical environment by refining the position of at least one object in the set of objects based on the scene graph and an alignment rule associated with a relationship in the scene graph.

20 Claims, 9 Drawing Sheets

OBJECT CORRECTION USING SCENE GRAPHS

CROSS-REFERENCE TO RELATED APPLICATIONS

This Application claims the benefit of U.S. Provisional Application Ser. No. 63/152,897 filed Feb. 24, 2021, which is incorporated herein in its entirety.

TECHNICAL FIELD

The present disclosure generally relates to systems, methods, and electronic devices that provide views of physical environments in which representations of objects are positioned, oriented, aligned with other objects, or otherwise adjusted based on information detected in the environments.

BACKGROUND

Various techniques are used to provide views of physical environments, e.g., scenes. Some techniques provide views based on three-dimensional (3D) representations of physical environments that are generated based on images of the physical environments. In such 3D environments, the positions, orientations, alignment, and other attributes of objects (e.g., tables, chairs, cups, etc.) may not correspond to the actual or appropriate characteristics of the physical objects of the physical environment. As a result of such characteristics of the 3D representations, views of the 3D representations depict objects that lack accurate or appropriate positioning, orientation, alignment with other objects, or other characteristics.

SUMMARY

Various implementations disclosed herein include devices, systems, and methods that provide views of physical environments based on leveraging scene understandings (e.g., object relationships represented in a scene graph). Scene understanding may be used to adjust objects to better correspond to the actual or appropriate characteristics of the physical objects of physical environment. A scene graph is a data structure of nodes and connections between the nodes. In some implementations, the nodes represent objects that correspond to physical objects of a physical environment, and the connections connecting the nodes represent relationships between the nodes. For instance, a lamp on a table can be represented by a scene graph having two nodes (i.e., lamp and table) and a connection representing "on" connecting them.

In some implementations, a three-dimensional (3D) representation of a physical environment is acquired, positions of objects within the 3D representation are detected to create a scene graph (e.g., a scene graph representing positional relationships between the objects), and a refined 3D representation is created utilizing the scene graph and one or more rules (e.g., alignment rules) associated with a relationship in the scene graph. For example, a couch angle may be changed to better align with a wall based on an understanding of how couches are typically oriented with respect to "next to" or adjacent walls via an alignment rule for couches.

In general, one innovative aspect of the subject matter described in this specification can be embodied in methods, at an electronic device, that include the actions of obtaining a three-dimensional (3D) representation of a physical environment that was generated based on sensor data obtained during a scanning process, detecting positions of a set of objects in the physical environment based on the 3D representation, generating a scene graph for the 3D representation of the physical environment based on the detected positions of the set of objects and the sensor data, wherein the scene graph represents the set of objects and relationships between the objects, and determining a refined 3D representation of the physical environment by refining the position of at least one object in the set of objects based on the scene graph and an alignment rule associated with a relationship in the scene graph.

These and other embodiments can each optionally include one or more of the following features.

In some aspects, refining the position of the at least one object is based on an angular position of the at least one object with respect to a wall structure. In some aspects, refining the position of the at least one object is based on a position of the at least one object with respect to a different object.

In some aspects, the set of objects is a first set of objects, and the method further includes detecting positions of a second set of objects in the physical environment based on the 3D representation, updating the scene graph for the 3D representation of the physical environment based on the detected positions of the second set of objects, and determining, based on the updated scene graph, that the second set of objects is a reflection of at least a portion of the first set of objects.

In some aspects, the 3D representation is associated with 3D semantic data that includes a 3D point cloud that includes semantic labels associated with at least a portion of 3D points within the 3D point cloud. In some aspects, the semantic labels identify walls, wall attributes, objects, and classifications of the objects of the physical environment.

In some aspects, a neural network is trained to refine the accuracy of identified alignments of the set of objects based on the positions and the 3D semantic data associated with each respective object in the set of objects, and output the refined 3D representation of the physical environment based on the refined accuracy of the identified alignments of the set of objects.

In some aspects, the 3D representation is an extended reality (XR) experience that is presented to a user. In some aspects, the sensor data includes depth data and light intensity image data obtained during the scanning process. In some aspects, the electronic device is a head-mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may

Figure 1:
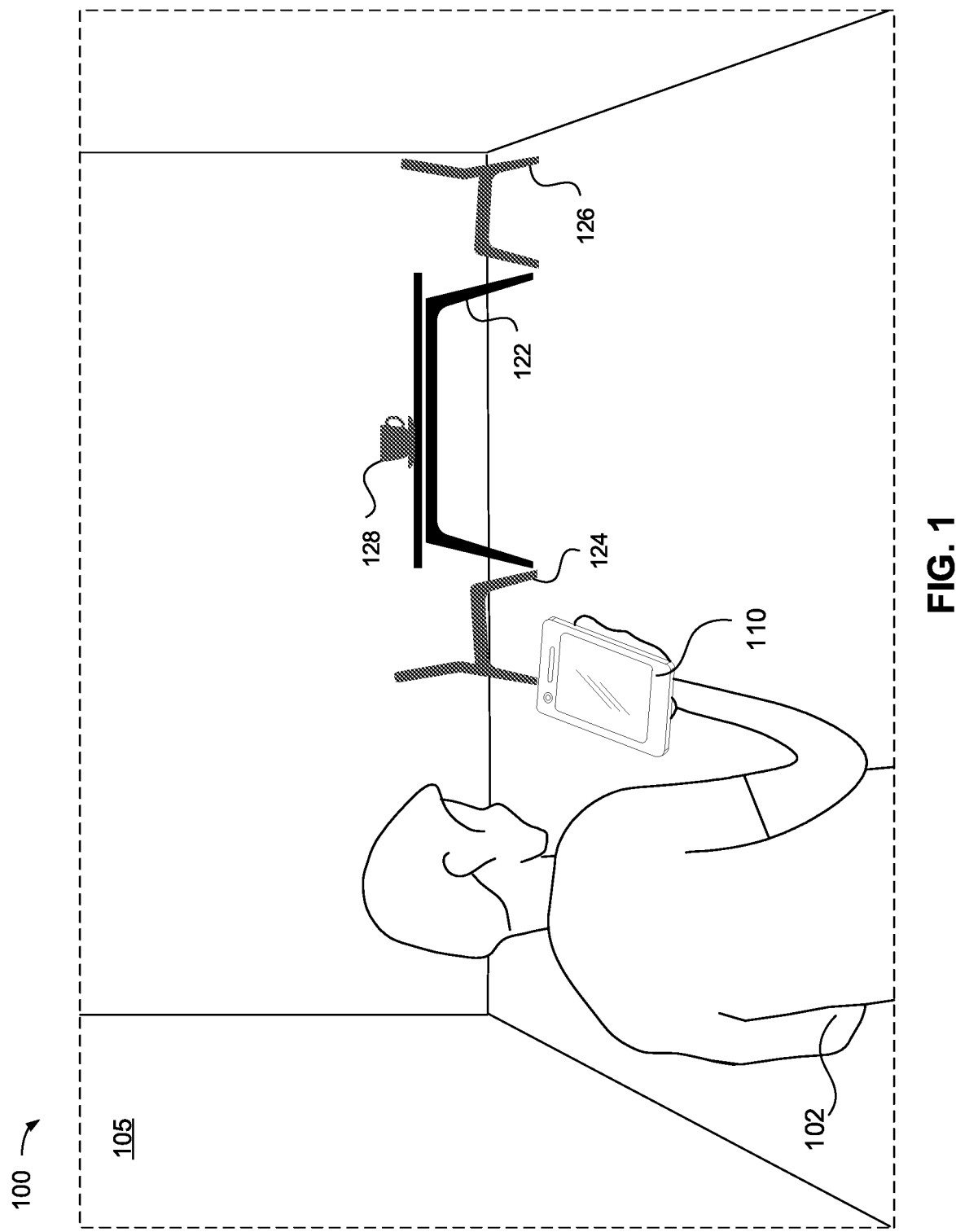
FIG. 1 is an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 illustrates an example operating environment 100 in accordance with some implementations. In this example, the example operating environment 100 illustrates an example physical environment 105 that includes physical objects such as table 122, chair 124, chair 126, and a cup 128 that is on top of the table. Additionally, example physical environment 105 includes a user 102 holding device 110. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 110 is configured to present an environment to the user 102. In some implementations, the device 110 is a handheld electronic device (e.g., a smartphone or a tablet). In some implementations, the user 102 wears the device 110 on his/her head. As such, the device 110 may include one or more displays provided to display content. For example, the device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 105.

A physical environment, such as physical environment 105, refers to a physical world that people can sense and/or interact with without aid of electronic systems. The physical environment may include physical features such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect rotational head movement and, in response, adjust graphical content and an acoustic field presented to the person in a manner similar to how such views and sounds would change in a physical environment. As another example, the XR system may detect rotational or translational movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), adjustments to characteristic(s) of graphical content in an XR environment may be made in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
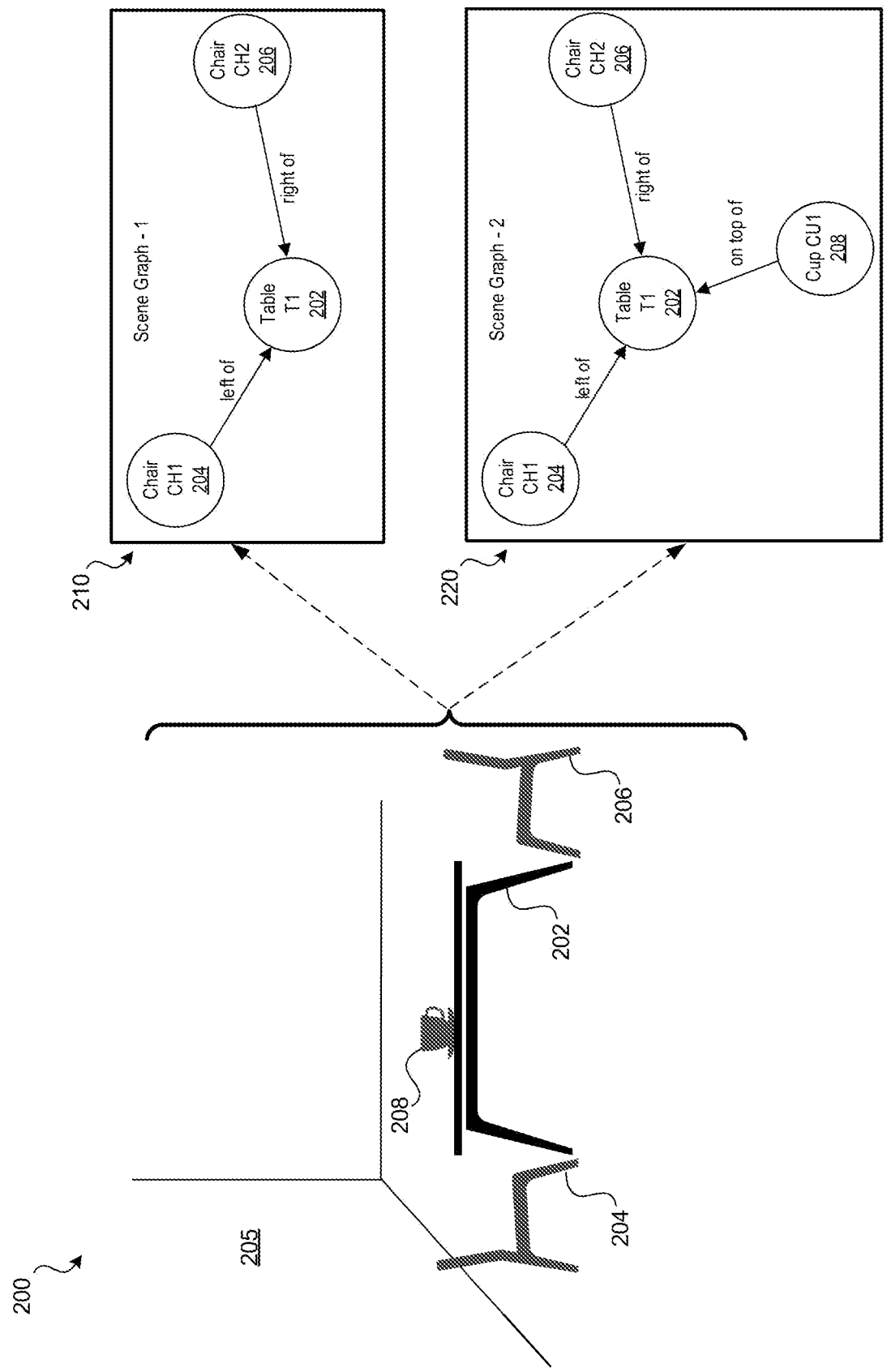
FIG. 2 illustrates an example operating environment and scene graphs representing relationships between objects in the operating environment in accordance with some implementations.

FIG. 2 illustrates an example environment 200 in accordance with some implementations. The operating environment 200 illustrates an example representation 205 of a physical environment (e.g., such as physical environment 105 of FIG. 1), that includes physical objects such as table 202, chair 204, chair 206, and cup 128 that is on top of the table 202.

Additionally, FIG. 2 illustrates scene graphs 210 and 220 (e.g., scene graphs for the current representation 205). The scene graphs 210 and 220 represent example relationships between the objects (e.g., table 202, chair 204, chair 206, and cup 128) in the representation 205 in accordance with some implementations. In this example, the scene graph 210 includes a first object, table "T1" 202, a second object, chair "CH1" 204, and a third object, chair "CH2" 206. The scene graph 220 includes a first object, table "T1" 202, a second object, chair "CH1" 204, a third object, chair "CH2" 206, and a fourth object, cup "CU1" 208. The example scene graphs 210, 220 identify relationships between each object. For example, the scene graph 210 includes a first relationship that identifies that the chair CH1 204 is "left of" table T1 202. A second relationship identifies that the chair CH2 206 is "right of" the table T1 202. Additionally, the scene graph 220 includes the same relationships as scene graphs 210, but further includes a third relationship that identifies that the cup CU1 208 is "on top of" the table T1 202. It should be noted that the relationships illustrated in the scene graph 210, 220 need not be limited to holding only one label—two, three, or more labels per relationship may be used.

A 3D representation (e.g., representation 205) may represent the 3D geometries of surfaces of a physical environment using a mesh, point cloud, or any other data structure. The data structure may include semantic information (e.g., a semantic mesh, a semantic point cloud, etc.) identifying semantic labels for data elements (e.g., semantically-labelled mesh points or mesh surfaces, semantically-labelled cloud points, etc.) that correspond to an object type, e.g., wall, floor, door, table, chair, cup, etc. The data structures and associated semantic information may be used to generate scene graphs. In some implementations, scene graphs are generated by transforming a semantic mesh into a graph. In some implementations the scene graphs are generated by transforming a point cloud into a graph. In some implementations, a physical environment (e.g., physical environment 105) is represented by object information that identifies objects and their 2D or 3D positions, e.g., using 2D or 3D bounding boxes, and the representation of the physical environment is transformed into a graph. In some implementations, the objects and relative 2D or 3D locations of the objects (e.g., or their respective bounding boxes) in 2D or 3D coordinates are used to determine room type, objects, object-to-object relationships, meta information (e.g., color, material, etc.), and features that are represented in a graph.

In some implementations, the 3D shape of a semantic mesh represents surfaces of objects of a physical environment and at least some of the vertices of the semantic mesh have semantic labels identifying object type (e.g., table, chair, vase, etc.). In such a mesh, for example, vertices on the floor surface may be labelled "floor", vertices on a chair's surfaces may be labelled "chair."

In some implementations, generating a semantic mesh involves estimating depths of different portions (e.g., pixels) of multiple images of a physical environment, correlating relationships (e.g., transforms) between poses of a camera used to capture the images, and generating a 3D mapping or other reconstruction of surfaces in the physical environment. Such a mapping/reconstruction may include locations in a 3D coordinate system for different surface points. In some implementations, a 3D triangle-based mesh is generated and each vertex of the mesh stores or otherwise is associated with a location, e.g., x,y,z positional information. One or more machine learning methods may be used to generate a 3D reconstruction. A machine learning method may include machine learning algorithms (e.g., PCA, clustering algorithms, etc.) and/or machine learning models (e.g., neural network-based approaches).

In some implementations, generating a semantic mesh involves techniques that do not utilize a machine learning method. For example, one exemplary method uses an algorithm to project vertices of a 3D reconstruction mesh onto semantic segmentation images from different viewpoints and then uses a majority voting technique to determine final vertices labels.

In some implementations, semantic information is included in or added to a 3D reconstruction of a physical environment. One or more machine learning methods may be used to classify objects, include, or add semantic information to a 3D reconstruction. In some implementations, a machine learning method is used to generate semantic labels for pixels of one or more images of the physical environment. Such semantic labels may be associated with corresponding portions of a 3D reconstructions based on determining associations between images and the 3D reconstruction. In some implementations, a machine learning method uses a 3D reconstruction and semantically labelled images (e.g., automatically labelled images) as input to produce a semantically-labeled mesh, e.g., a semantic mesh having at least some vertices that are associated with semantic labels.

In some implementations, transforming the semantic mesh into a graph involves converting the vertices of the semantic mesh to nodes and determining edges connecting nearby nodes to one another. The edges of the graph may represent the sides of the faces of the semantic mesh. The nodes may store information about the coordinates (e.g., x, y, z coordinates), semantic labels, and other information extracted from the semantic mesh.

In some implementations, graph reduction reduces the complexity of the original semantic mesh or the graph representing the original semantic mesh, for example, reducing the number of nodes in such a graph. In some implementations, instance detection involves identifying or estimating separate instances of objects in the semantic mesh or graph representing the semantic mesh. In some implementations, instance detection is performed using a machine learning method that utilizes semantic locations and 3D locations of nodes of the graph to identify instances.

In some implementations, a machine learning method is used to estimate relationships between objects of the semantic mesh or graph representing the semantic mesh. Examples of relationships include, but are not limited to, estimations that a first object is on top of a second object, a first object is under a second object, a first object is next to a second object, a first object is in contact with a second object, a first object is attached to a second object, a first object is leaning on a second object, a first object (e.g., a person) is holding a second object, a first object is within a second object, a first object is hanging from a second object, a first object is close to a second object, a first object is facing towards a second object, a first object is facing away from a second object, a first object is in front of a second object, a first object is behind a second object, and a first object and a second object are aligned with one another.

In some implementations, the relationships between objects that are produced by the machine learning method are estimated as probabilities, e.g., providing a 99% chance that table T1 is on top of floor F1, a 90% chance that container C1 on top of table T1, a 75% chance that chair C1 is next to table T1, a 75% chance that chair C2 is facing television TV1, a 75% chance that handle H1 is attached to door D1, etc.

An image of the physical environment and/or pose information about the position and orientation of a camera capturing the image may additionally be input to the machine learning method to further improve its accuracy or efficiency. Camera pose information may be used to produce viewpoint specific relationships. For example, if an XR environment is being produced using live images, the pose (e.g., location and orientation) of the user's current device may be used to facilitate a viewpoint specific relationship determination, e.g., identifying that, from the user's current viewpoint, the chair is in front of the table.

In some implementations, the machine learning method outputs a graph representing the objects and their relationships, e.g., scene graph 210 and 220. In some implementations, the machine learning method outputs pairwise relationships between objects. A relationship between two or more objects may be represented in any suitable format for output and use.

FIGS. 3-6 illustrate example operating environments that include representations of physical environments, scene graphs representing relationships between objects in each representation, and an example system flow of providing an adjustment to a position of an object within each representation in accordance with some implementations.

Figure 3:
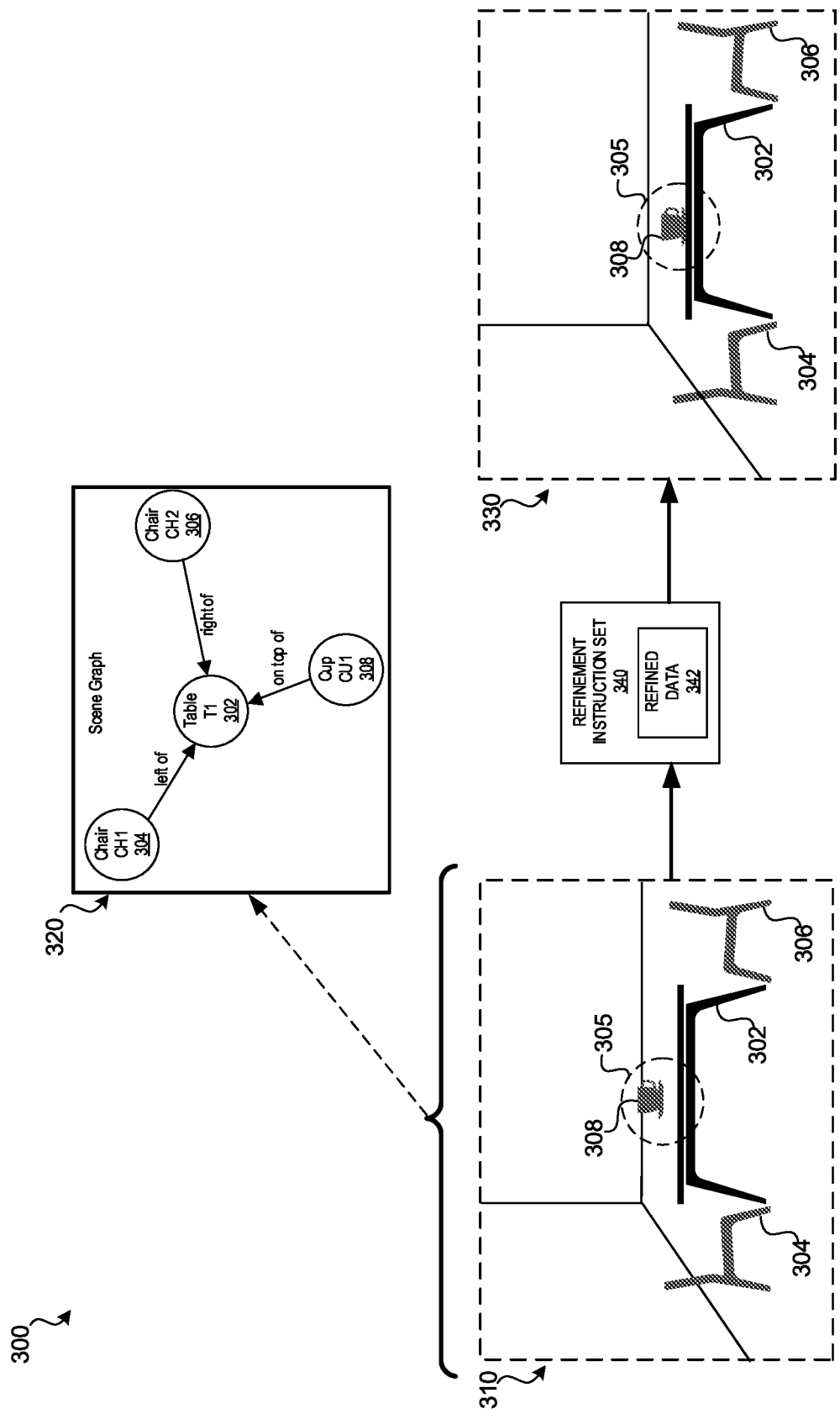
FIG. 3 illustrates an example system flow of providing an adjustment to a position of an object within a three-dimensional (3D) representation of a physical environment based on a scene graph in accordance with some implementations.

FIG. 3 illustrates an example operating environment 300 of an example system flow of providing an adjustment to a position of an object within a 3D representation of a physical environment based on a scene graph representing relationships between objects detected in the 3D representation in accordance with some implementations. In particular, environment 300 illustrates adjusting a position of a cup to be displayed on top of a table within a representation of a physical environment.

Example operating environment 300 includes representation 310 of an example physical environment (e.g., environment 100 of FIG. 1) that includes representations physical objects such as table 302, chair 304, chair 306, and cup 308 (e.g., representations of physical objects in FIG. 1, such as table 122, chair 124, chair 126, and cup 128, respectively). The scene graph 320 (e.g., a scene graph for the current environment) represents an example relationship between the objects (e.g., table 302, chair 304, chair 306, and cup 308) in the representation 310 in accordance with some implementations. In this example, the scene graph 320 includes a first object, table "T1" 302, a second object, chair "CH1" 304, a third object, chair "CH2" 306, and a fourth object, cup "CU1" 308. The example scene graph 320 identifies relationships between each object. For example, the scene graphs 320 includes a first relationship that identifies that the chair CH1 304 is "left of" table T1 302. A second relationship identifies that the chair CH2 306 is "right of" the table T1 302. And a third relationship that identifies that the cup CU1 308 is "on top of" the table T1 302. It should be noted that the relationships illustrated in the scene graph 320 need not be limited to holding only one label—two, three, or more labels per relationship may be desirable.

The system flow of the example operating environment 300 illustrates the information pipeline for the refinement instruction set 340. For example, the refinement instruction set 340 receives data for the representation 310, which includes the data from scene graph 320. The refinement instruction set 340 can generate refined data 342 for the representation 310 based on the scene graph 320 relationships between each identified object. For example, and as illustrated in FIG. 3, the cup 308 in the representation 310 is supposed to be "on top of" the table 302, but, due to some alignment issues in generating the representation 310, the cup 308 is floating above the table 302 as highlighted within area 305. Based on an alignment rule associated with a relationship in the scene graph 320, refinement instruction set 340 can generate refined data 342, which includes adjusting the position of the cup 308 to be precisely on top of the table 302 within the refined representation 330 within the highlighted area 305. For example, an alignment rule obtained by the refinement instruction set 340 may include a rule that specifies that a first object within a scene graph identified to be "on top of" a second object, should then be displayed in the representation as in a location that is (or appears to be) "on top of" the second object. Thus, based on the alignment rules and a scene graph, the refinement instruction set 340 will adjust positions of objects within representations of an environment to more accurately display the objects with each representation.

Figure 4:
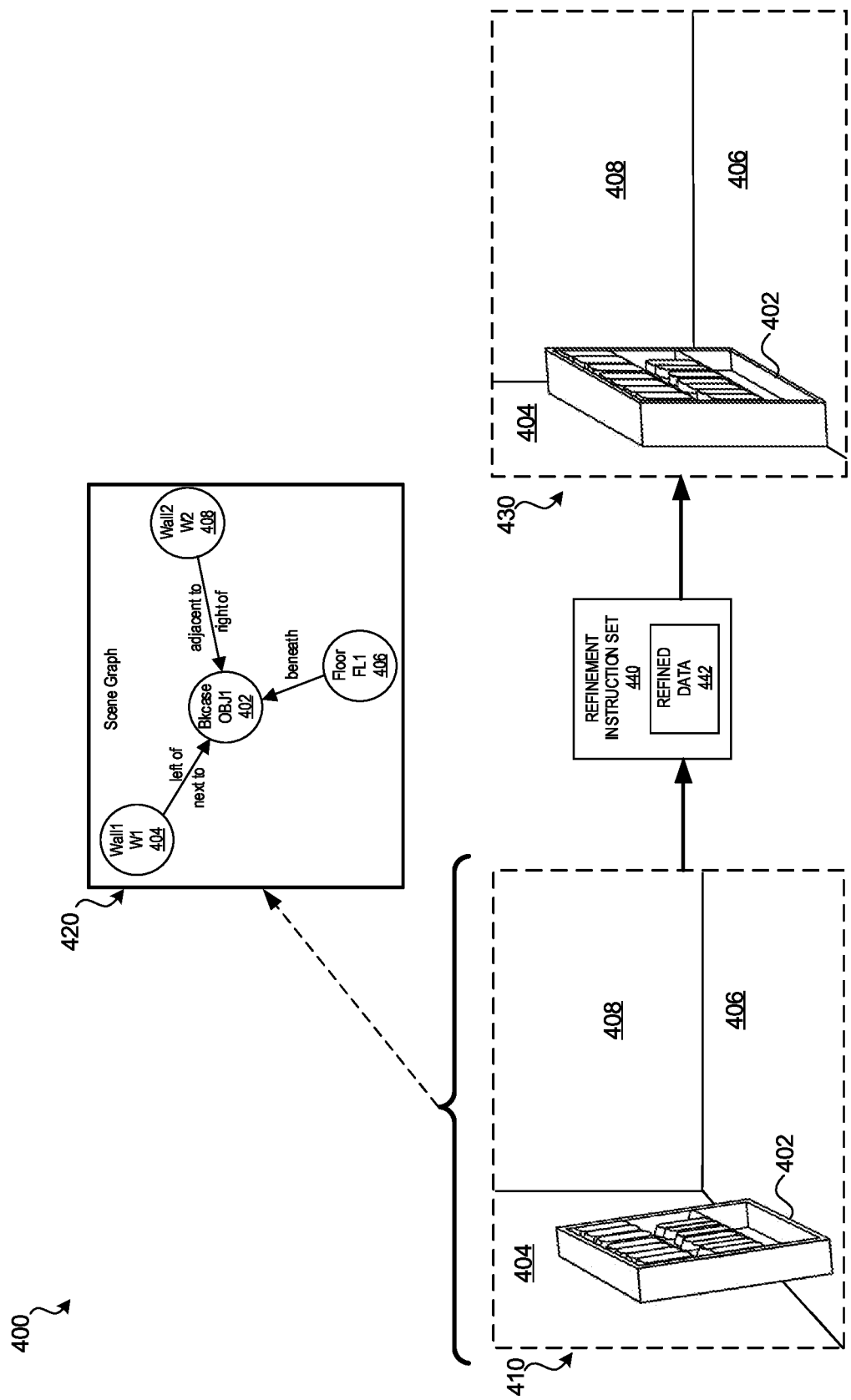
FIG. 4 illustrates an example system flow of providing an adjustment to a position of an object within a 3D representation of a physical environment based on a scene graph in accordance with some implementations.

FIG. 4 illustrates an example operating environment 400 of an example system flow of providing an adjustment to a position of an object within a 3D representation of a physical environment based on a scene graph representing relationships between objects detected in the 3D representation in accordance with some implementations. In particular, operating environment 400 illustrates adjusting a position of a bookshelf to be displayed more accurately by aligning the bookshelf with the adjacent walls and floor within a representation of a physical environment.

Example operating environment 400 illustrates a representation 410 of an example physical environment that includes representations physical objects such as bookshelf 402, back wall 404, floor 406, and adjacent wall 408. The scene graph 420 (e.g., a scene graph for the current environment) represents an example relationship between the objects (e.g., bookshelf 402, back wall 404, floor 406, and adjacent wall 408) in the representation 410 in accordance with some implementations. In this example, the scene graph 420 includes a first object, bookshelf "OBJ1" 402, a second object, back wall "W1" 404, a third object, floor "FL1" 406, and a fourth object, adjacent wall "W2" 408. The example scene graph 420 identifies relationships between each object. For example, the scene graph 420 includes a first relationship that identifies that the back wall W1 404 is "next to" and "left of" bookshelf OBJ1 402 (e.g., "next to" referring to being place against the wall). A second relationship identifies that the floor FL1 406 is "beneath" the bookshelf OBJ1 402. And a third relationship that identifies that the adjacent wall W2 408 is "adjacent to" and "right of" the bookshelf OBJ1 402. It should be noted that the relationships illustrated in the scene graph 420 need not be limited to holding only one label—two, three, or more labels per relationship may be desirable.

The system flow of the example operating environment 400 illustrates the information pipeline for the refinement instruction set 440. For example, the refinement instruction set 440 receives data for the representation 410, which includes the data from scene graph 420. The refinement instruction set 440 can generate refined data 442 for the representation 410 based on the scene graph 420 relationships between each identified object. For example, and as illustrated in FIG. 4, the bookshelf 402 in the representation 410 is supposed to be aligned with and up against the back wall 404 and perpendicular with respect to the floor 406, but, due to some alignment issues in generating the representation 410, the bookshelf 402 is misaligned and appears to be leaning. Based on an alignment rule associated with a relationship in the scene graph 420, refinement instruction set 440 can generate refined data 442, which includes adjusting the position of the bookshelf 402 to be precisely perpendicular with the floor 406 and up against the back wall 404 as illustrated within the refined representation 430. For example, an alignment rule obtained by the refinement instruction set 440 may include a rule that specifies that a first object within a scene graph identified to be "next to" a second object, should then be displayed in the representation as in a location that is (or appears to be) up against the second object. Additionally, or alternatively, the alignment rule may specify that objects that are designated as "next to" a wall, should be refined to be up against the particular wall. Thus, based on the alignment rules and a scene graph, the refinement instruction set 440 will adjust positions of objects within representations of an environment to more accurately display the objects with each representation.

Figure 5:
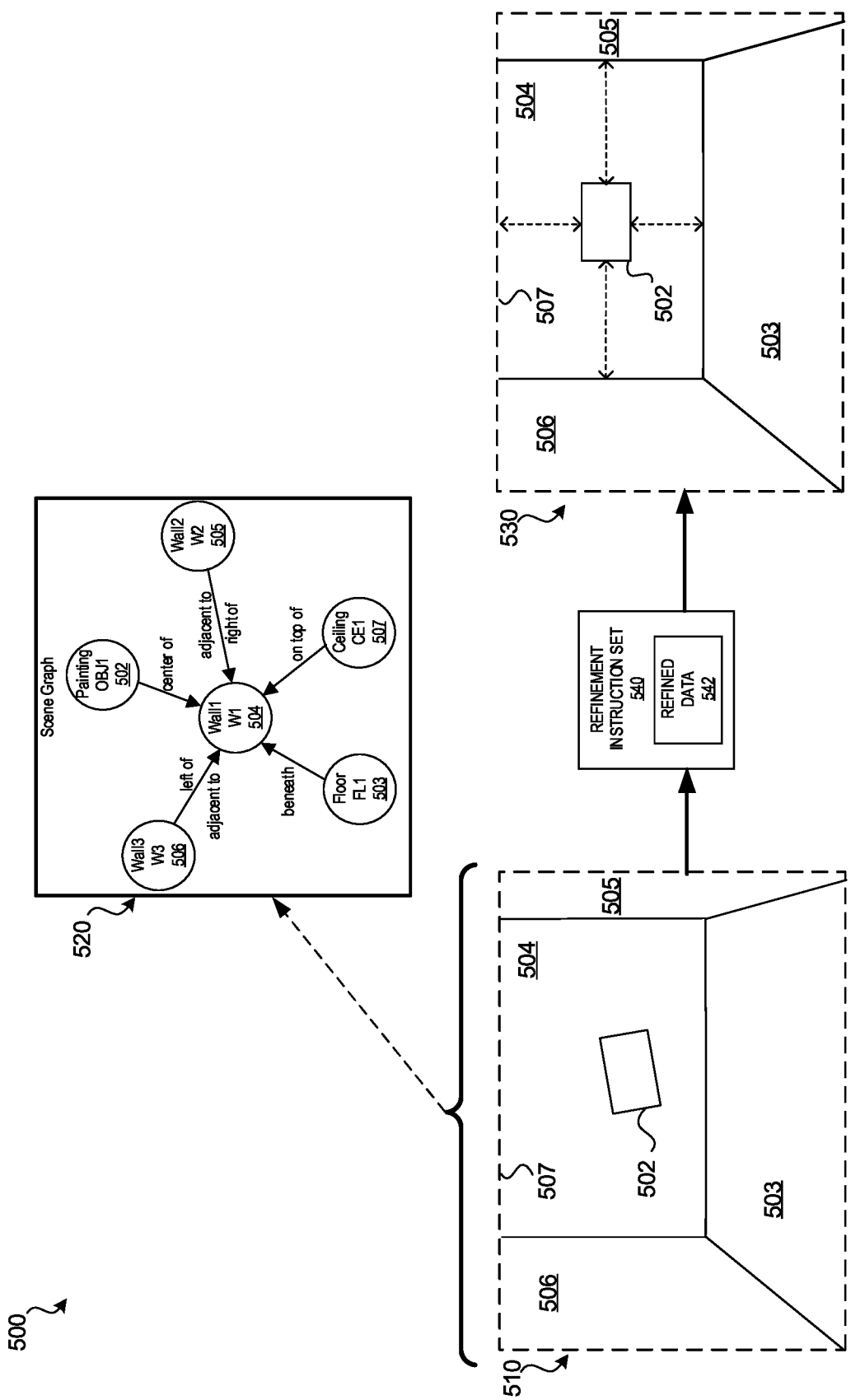
FIG. 5 illustrates an example system flow of providing an adjustment to a position of an object within a 3D representation of a physical environment based on a scene graph in accordance with some implementations.

FIG. 5 illustrates an example operating environment 500 of an example system flow of providing an adjustment to a position of an object within a 3D representation of a physical environment based on a scene graph representing relationships between objects detected in the 3D representation in accordance with some implementations. In particular, environment 500 illustrates adjusting a position of a painting to be displayed more accurately by aligning the frame of the painting on a wall with respect to the adjacent walls, floor, and ceiling within a representation of a physical environment.

Example operating environment 500 illustrates a representation 510 of an example physical environment that includes representations physical objects such as painting 502, floor 503, anchor wall 504, adjacent wall-1 505, adjacent wall-2 506, and ceiling 507. The scene graph 520 (e.g., a scene graph for the current environment) represents an example relationship between the objects (e.g., painting 502, floor 503, anchor wall 504, etc.) in the representation 510 in accordance with some implementations. In this example, the scene graph 520 includes a first object, painting "OBJ1" 502, a second object, floor "FL1" 503, a third object, anchor wall "W1" 504, a fourth object, adjacent wall-1 "W2" 505, a fifth object, adjacent wall-2 "W3" 506, and a sixth object, ceiling "CE1" 507. The example scene graph 520 identifies relationships between each object. For example, the scene graph 520 includes a first relationship that identifies that the painting OBJ1 is in the center of anchor wall W1 504 (e.g., the midpoint of the painting). A second relationship and third relationship of the scene graph 520 identifies that the two adjacent walls 505, 506, are located adjacent to and either to the left of or right of the anchor wall W1 504. A fourth relationship identifies that the floor FL1 503 is "beneath" the anchor wall W1 504. And a fifth relationship that identifies that the ceiling CE1 507 is "on top of" the anchor wall W1 504. It should be noted that the relationships illustrated in the scene graph 520 need not be limited to holding only one label—two, three, or more labels per relationship may be desirable.

The system flow of the example operating environment 500 illustrates the information pipeline for the refinement instruction set 540. For example, the refinement instruction set 540 receives data for the representation 510, which includes the data from scene graph 520. The refinement instruction set 540 can generate refined data 542 for the representation 510 based on the scene graph 520 relationships between each identified object. For example, and as illustrated in FIG. 5, the painting 502 in the representation 510 is supposed to be centered and aligned on the anchor wall 504 with respect to each adjacent wall 505, 506, the floor 504, and the ceiling 507, but, due to some alignment issues in generating the representation 510, the painting 502 is misaligned and appears to be tilted. Based on an alignment rule associated with a relationship in the scene graph 520, refinement instruction set 540 can generate refined data 542, which includes adjusting the position of the midpoint of the painting 502 to be precisely perpendicular with respect to adjacent walls 506, 505, and the floor 503, and centered with respect to the anchor wall 504 as illustrated within the refined representation 530. The midpoint of the painting 502 would be used such that a circular or rectangular painting could be hung accurately. For example, an alignment rule obtained by the refinement instruction set 540 may include a rule that specifies that a first object within a scene graph identified to be "center of" a second object, should then be displayed in the representation as in a location that is (or appears to be) centered with respect to the second object. Additionally, or alternatively, the alignment rule may be specific to identified objects as paintings that specify that a midpoint of a painting should be a specific height with respect to the floor (e.g., a good rule of thumb is to hang art so that its midpoint is between 57 and 60 inches from the floor). Thus, based on the alignment rules and a scene graph, the refinement instruction set 540 will adjust positions of objects within representations of an environment to more accurately display the objects with each representation.

Figure 6:
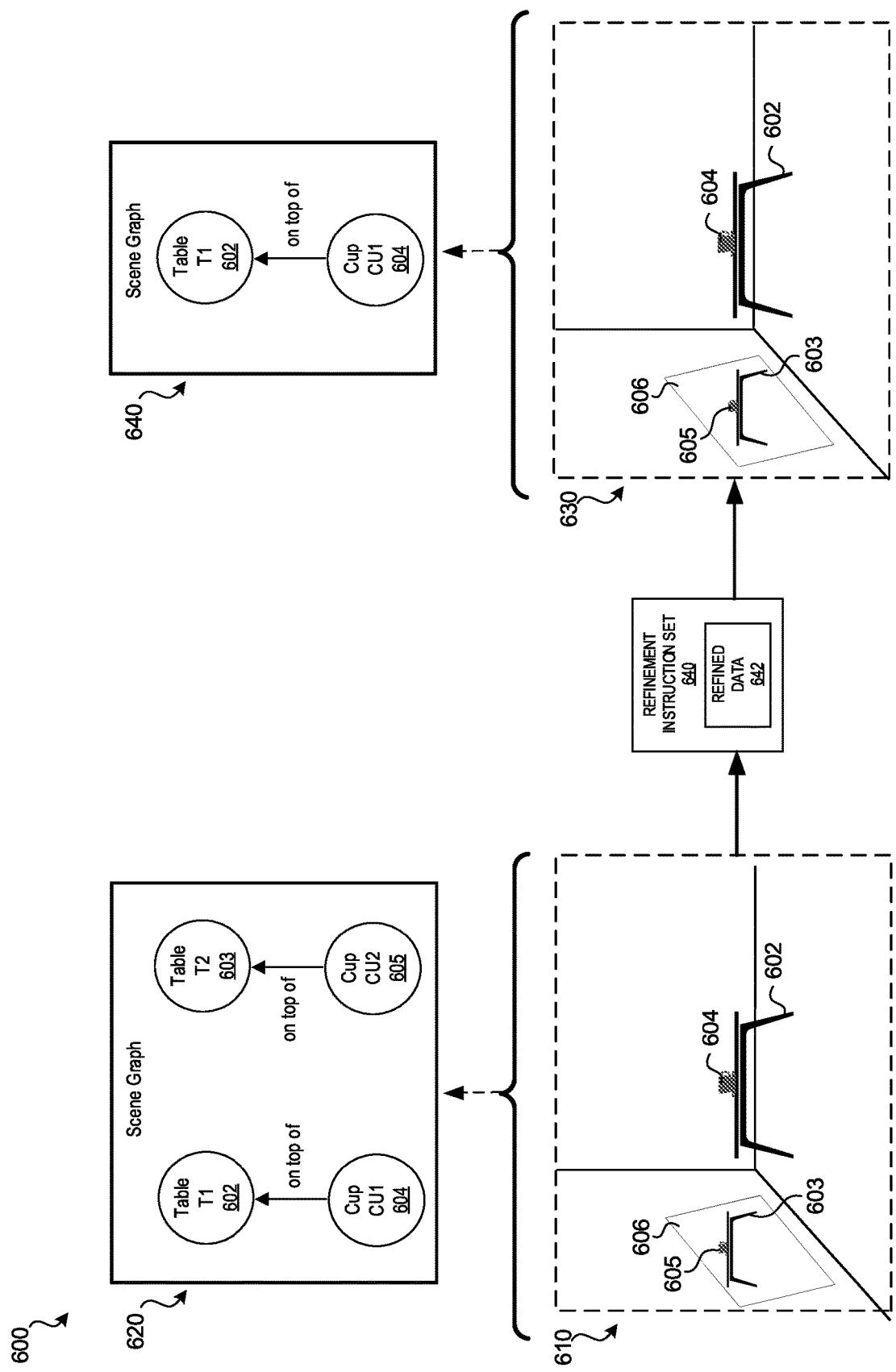
FIG. 6 illustrates an example system flow of providing an adjustment to a scene graph based on a detected reflected portion of a 3D representation of a physical environment in accordance with some implementations.

FIG. 6 illustrates an example operating environment 600 of an example system flow of providing an adjustment to a scene graph representing relationships between objects detected in the 3D representation of a physical environment based on a detected reflected portion within the 3D representation in accordance with some implementations. In particular, operating environment 600 illustrates detecting a reflected portion within the representation of a physical environment (e.g., a mirrored image of the same table and cup) based on a scene graph, and updating the scene graph by removing the objects (e.g., mirror nodes) and reactions from the scene graph. In other words, the system can determine that the mirrored objects are not within the representation of a physical environment (e.g., they are not a part of another room), but merely a reflection therein.

Example operating environment 600 illustrates a representation 610 of an example physical environment that includes representations physical objects such as table 602, cup 604, mirrored table 603, mirrored cup 605, and a mirror 606. The first scene graph 620 (e.g., a scene graph for the current environment) represents an example relationship between the objects (e.g., table 602, cup 604, mirrored table 603, and mirrored cup 605) in the representation 610 in accordance with some implementations. In this example, the scene graph 620 includes a first object, table "T1" 602, a second object, cup "CU1" 604, a third object, mirrored table "T2" 603, and a fourth object, mirrored cup "CU2" 605. The example scene graph 620 identifies relationships between each object. For example, the scene graph 620 includes a first relationship, similar to FIG. 3, that identifies that the cup CU1 604 is "on top of" table T1 602. Similarly, a second relationship identifies that the mirrored cup CU2 605 is "on top of" mirrored table T2 603. It should be noted that the relationships illustrated in the scene graph 620 need not be limited to holding only one label—two, three, or more labels per relationship may be desirable. For example, scene graph 620 may include the relationships between the mirror 606 and the table 602 (e.g., the mirror 606 is "to the left of" table 602. Additionally, scene graph 620 may include the relationships between the mirror 606 and the adjacent walls, floor, ceiling, etc., in order to align the mirror on the wall per an associated alignment rule (e.g., such as hanging a painting as illustrated and discussed herein with reference to FIG. 5).

The system flow of the example operating environment 600 illustrates the information pipeline for the refinement instruction set 640. For example, the refinement instruction set 640 receives data for the representation 610, which includes the data from scene graph 620. The refinement instruction set 640 can generate refined data 642 for the representation 610 based on the scene graph 620 relationships between each identified object and, as opposed to previous examples in FIG. 3-5 for refining the representations of the objects, refinement instruction set 640 can modify the scene graph based on detecting a reflection that causes a misinterpretation of the objects within the physical environment. For example, and as illustrated in FIG. 6, refinement instruction set 640 detects a reflected portion within the representation of a physical environment (e.g., a mirrored image of the table 605 and cup 603 within the mirror 606) based on the scene graph 620. The refinement instruction set 640 can then update or refine the scene graph by removing the objects (e.g., mirror nodes) and relationships from the scene graph to create an updated scene graph (e.g., scene graph 640. In other words, the refinement instruction set 640 can determine that the mirrored objects are not within the representation of a physical environment (e.g., they are not a part of another room), but merely a reflection therein. For example, an alignment rule for reflections obtained by the refinement instruction set 640 may include a rule that determines that identical objects within two scene graph's with the same relationship (e.g., a cup "on top of" the table) can be identified as reflected objects, and then the reflected objects should be removed from the scene graph. Thus, based on the alignment rules and a scene graph, the refinement instruction set 640 can refine or remove scene graph nodes and relationships to more accurately display the objects with each scene graph for each representation.

Figure 7:
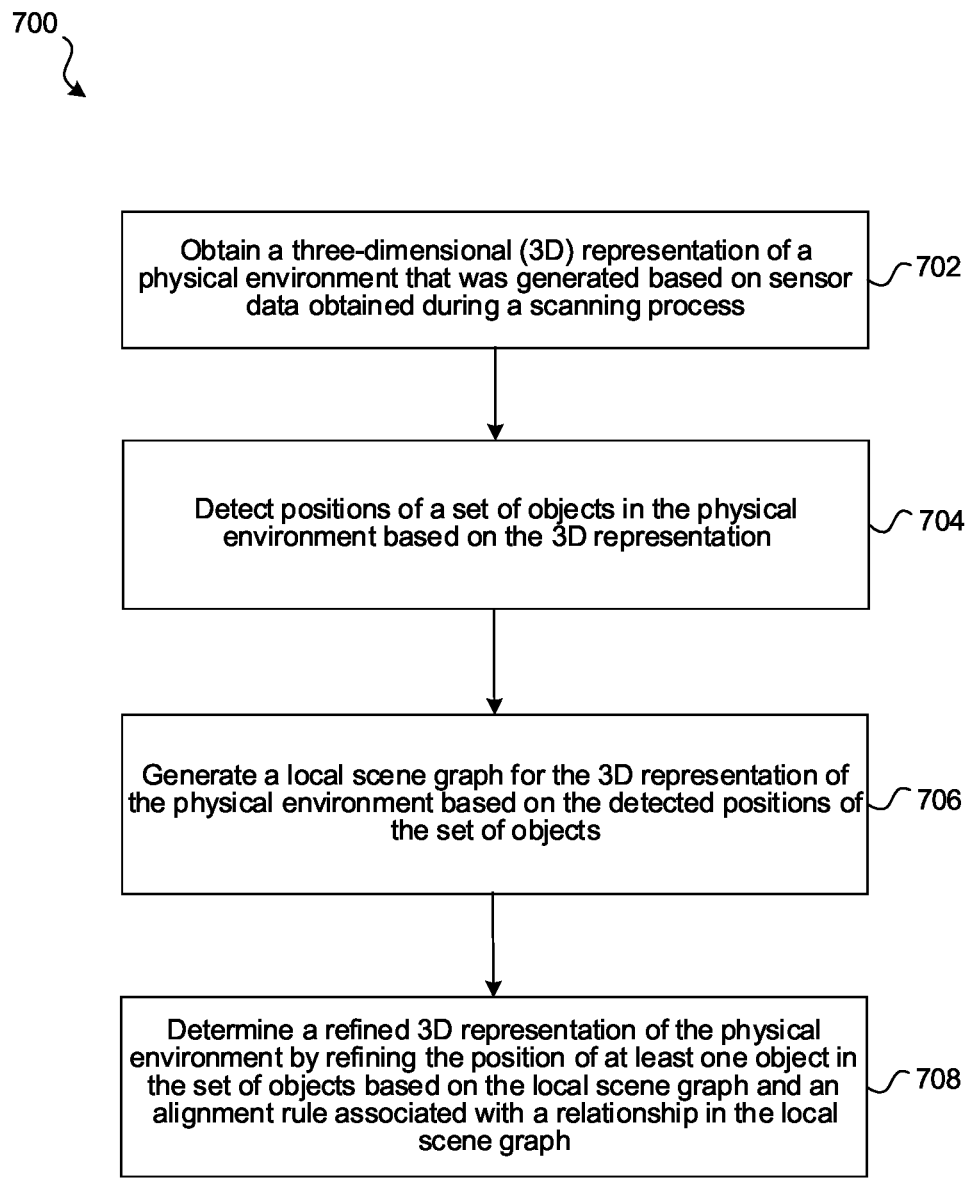
FIG. 7 is a flowchart representation of an exemplary method that refines a position of an object within a 3D representation of a physical environment based on a scene graph in accordance with some implementations.

FIG. 7 is a flowchart representation of an exemplary method 700, performed at an electronic device having a processor, that leverages scene understandings (e.g., object relationships represented in a scene graph) to adjust the position of objects to improve accuracy with representations of physical environments, in accordance with some implementations. In some implementations, the method 700 is performed by a device (e.g., device 110 of FIG. 1), such as a mobile device, desktop, laptop, or server device. In some implementations, the device has a screen for displaying images and/or a screen for viewing stereoscopic images such as a head-mounted display (HMD). In some implementations, the method 700 is performed by processing logic, including hardware, firmware, software, or a combination thereof. In some implementations, the method 700 is performed by a processor executing code stored in a non-transitory computer-readable medium (e.g., a memory). The refinement process of method 700 is illustrated with examples with reference to FIGS. 2-6 and illustrated as a system flow diagram with reference to FIG. 8.

At block 702, the method 700 obtaining a 3D representation of a physical environment that was generated based on sensor data obtained during a scanning process. For example, sensor data for a physical environment may include room scanning techniques (e.g., creating a floorplan) that may include one or more images of the room the user (e.g., user 102) is currently located. In some implementations, the sensor data may include depth data (e.g., time-of-flight data, LIDAR, etc.) from a depth sensor and light intensity image data (e.g., RGB data) obtained during a scanning process. Alternatively, the depth data may be extrapolated from the light intensity image data, thus not requiring a depth sensor. In some implementations, a 3D representation can be created based on a user performing a room scan process by moving a mobile device to capture images and depth data around the user in a room.

At block 704, the method 700 detects positions of a set of objects in the physical environment based on the 3D representation. For example, the set of objects may include furniture such as chairs, tables, couches, etc., or other object located in the room, such as cups, a lamp, toys, etc. Additionally, the set of objects may further include wall structures, e.g., walls, doors, floor, ceiling, etc. An object detection instruction set may be included that is configured with instructions executable by a processor to analyze the sensor data to identify objects. For example, an object detection instruction set can analyze the sensor data (e.g., RGB images, a sparse depth map, and other sources of physical environment information) to identify objects (e.g., furniture, appliances, wall structures, etc.). In some implementations, the object detection instruction set can use machine learning methods for object identification. In some implementations, the machine learning method is a neural network (e.g., an artificial neural network), decision tree, support vector machine, Bayesian network, or the like. For example, the object detection instruction set uses an object detection neural network unit to identify objects and/or an object classification neural network to classify each type of object.

At block 706, the method 700 generating a scene graph for the 3D representation of the physical environment based on the detected positions of the set of objects and the sensor data, wherein the scene graph represents a set of objects (e.g., chairs, tables, cups, etc.) and relationships between the objects. The scene graph may represent various information, for example, providing a hierarchy that represents room type, objects, object-to-object relationships, meta information (e.g., color, material, etc.), and features. An exemplary scene graph may include a room node and the room node may identify metadata (e.g., room type=living room) and be linked to 4 wall objects, a table object, and six chair objects. Moreover, a chair object may identify metadata and features (e.g., identifying object type/semantic label=chair, it has a 3D mesh with specific node locations, it has a color of brown, it has particular keyframes or keyframe portions, etc. The scene graph may also represent positional relationships of objects relative to the room and/or one another, e.g., within, adjacent to, facing, etc. For example, positional relationships such as a chair facing table, a cup on top of table, a bookshelf next to a wall, reflected objects on a mirror, etc. Some of these different examples of different positional relationships of objects with respect to other objects are illustrated with reference to FIGS. 2-6.

In some implementations, a machine learning method is used to estimate relationships between objects of the semantic mesh or graph representing the semantic mesh. Examples of relationships include, but are not limited to, estimations that a first object is on top of a second object, a first object is under a second object, a first object is next to a second object, a first object is in contact with a second object, a first object is attached to a second object, a first object is leaning on a second object, a first object (e.g., a person) is holding a second object, a first object is within a second object, a first object is hanging from a second object, a first object is close to a second object, a first object is facing towards a second object, a first object is facing away from a second object, a first object is in front of a second object, a first object is behind a second object, and a first object and a second object are aligned with one another.

In some implementations, the relationships between objects that are produced by the machine learning method are estimated as probabilities, e.g., providing a 99% chance that table T1 is on top of floor F1, a 90% chance that container C1 on top of table T1, a 75% chance that chair C1 is next to table T1, a 75% chance that chair C2 is facing television TV1, a 75% chance that handle H1 is attached to door D1, etc.

At block 708, the method 700, determines a refined 3D representation of the physical environment by refining the position of at least one object in the set of objects based on the scene graph and an alignment rule associated with a relationship in the scene graph. For example, an alignment rule may specify that a couch "next to" an adjacent wall should be parallel to the wall.

In some implementations, refining the position of the at least one object is based on an angular position of the at least one object with respect to a wall structure. For example, adjusting a crooked couch with respect to a wall. In some implementations, refining the position of the at least one object is based on a position of the at least one object with respect to a different object. For example, as illustrated with FIG. 3, a floating cup is adjusted with respect to a table.

In some implementations, the set of objects is a first set of objects, and the method 700 further includes detecting positions of a second set of objects (e.g., objects reflected in a mirror) in the physical environment based on the 3D representation, updating the scene graph for the 3D representation of the physical environment based on the detected positions of the second set of objects, and determining, based on the updated scene graph, that the second set of objects is a reflection of at least a portion of the first set of objects. For example, as illustrated in FIG. 6, a mirror within the 3D representation may be detected, or objects presented in the mirror are detected as reflections.

In some implementations, the 3D representation is associated with 3D semantic data that includes a 3D point cloud that includes semantic labels associated with at least a portion of 3D points within the 3D point cloud. In some implementations, the semantic labels identify walls, wall attributes, objects, and classifications of the objects of the physical environment. In some implementations, a neural network is trained to refine the accuracy of identified alignments of the set of objects based on the positions and the 3D semantic data associated with each respective object in the set of objects, and output the refined 3D representation of the physical environment based on the refined accuracy of the identified alignments of the set of objects.

In some implementations, the method 700 further includes generating, based on the local scene graph, a view of a 3D representation including the physical environment. For example, a 3D representation of the physical environment 105 may be created based on scanning the room. In some implementations, the view of the 3D representation is in an MR environment where the user is wearing an HMD, but is viewing the physical environment (e.g., pass-through video of the user's room). In some implementations, the 3D environment is an XR experience that is presented to a user. For example, the 3D representation and the objects within the 3D representation is all computer generated content, but based on the physical environment of the user. In some implementations, presenting the views of the 3D representation includes presenting video pass-through or see-through images of at least a portion of a physical environment, wherein a 3D reconstruction of at least the portion of the physical environment is dynamically generated.

Figure 8:
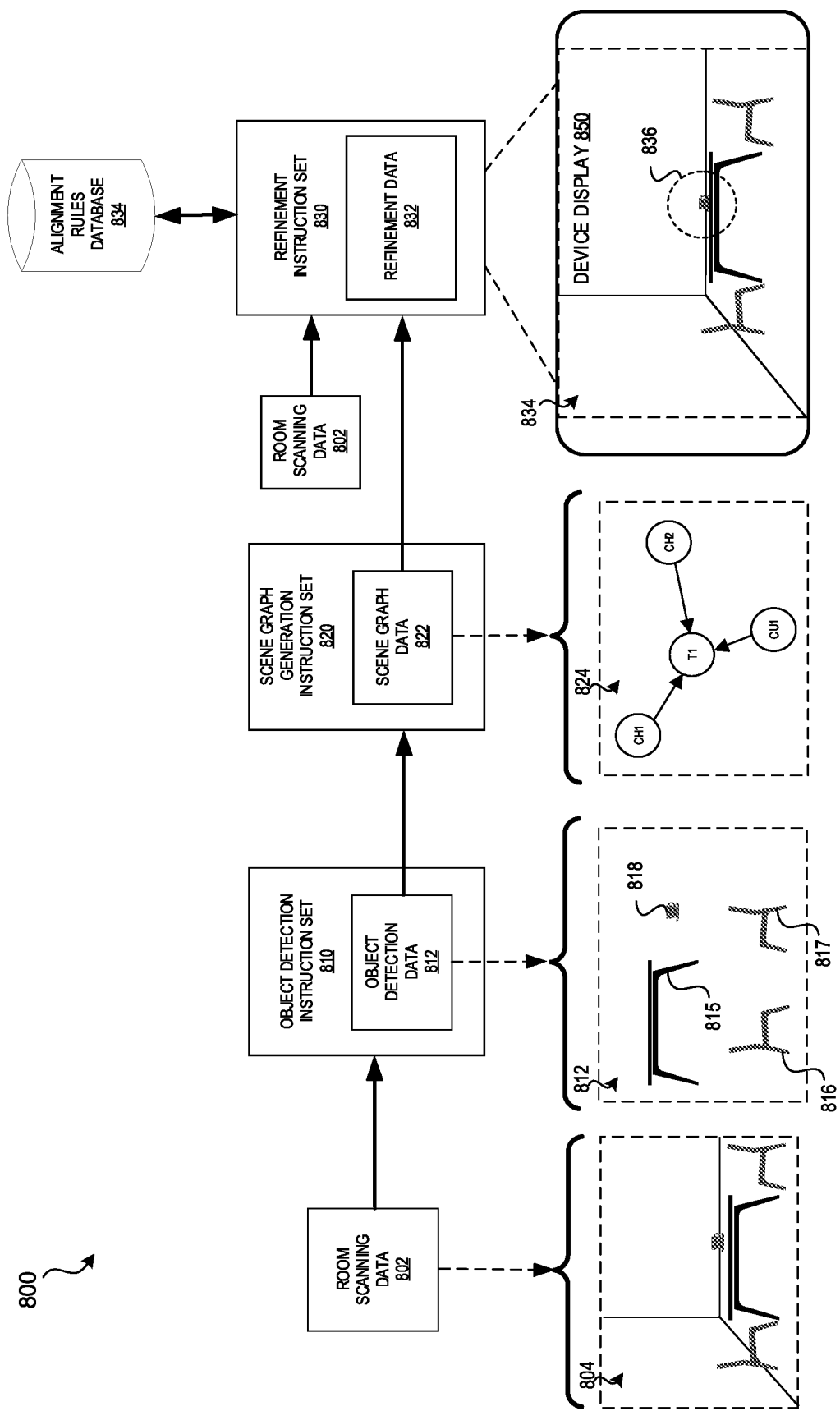
FIG. 8 is a system flow diagram of an example environment in which a system can refine a position of an object within a 3D representation of a physical environment based on a scene graph in accordance with some implementations.

FIG. 8 illustrates a system flow diagram of an example operating environment 800 in which a system can leverage scene understandings (e.g., object relationships represented in a scene graph) to adjust the position of objects to improve accuracy with representations of physical environments according to some implementations. In some implementations, the system flow of the example environment 800 is performed on a device (e.g., device 110 of FIG. 1), such as a mobile device, desktop, laptop, or server device. The images of the example environment 800 can be displayed on the device that has a screen for displaying images and/or a screen for viewing stereoscopic images such as a HMD. In some implementations, the system flow of the example environment 800 is performed on processing logic, including hardware, firmware, software, or a combination thereof. In some implementations, the system flow of the example environment 800 is performed on a processor executing code stored in a non-transitory computer-readable medium (e.g., a memory).

The overall system flow of the example operating environment 800 acquires room scanning data (e.g., image data) from sensors for a plurality of physical environments (e.g., the physical environment 105 of FIG. 1), detects positions of a set of objects (e.g., chairs, tables, cups, wall structures, etc.) in the physical environment based on the 3D representation, generates a scene graph for the 3D representation of the physical environment based on the detected positions of the set of objects and the sensor data, and determines a refined 3D representation of the physical environment by refining the position of at least one object in the set of objects based on the scene graph and an alignment rule associated with a relationship in the scene graph. For example, a couch angle may be changed to better match a wall based on an understanding of how couches are typically oriented with respect to "next to" or adjacent walls via an alignment rule for couches/furniture.

In an example implementation, the environment 800 includes an image composition pipeline that acquires or obtains data (e.g., image data from image source(s)) of a physical environment from a sensor on a device (e.g., device 110 of FIG. 1) as room scanning data 802. Room scanning data 802 is an example of acquiring image sensor data (e.g., light intensity data, depth data, and position information) for a plurality of image frames. For example, a user may acquire image data as the user is in a room in a physical environment (e.g., the physical environment 105 of FIG. 1). The images of the room scanning data can be displayed on the device that has a screen for displaying images and/or a screen for viewing stereoscopic images such as a HMD. The image source(s) may include a depth camera that acquires depth data of the physical environment, a light intensity camera (e.g., RGB camera) that acquires light intensity image data (e.g., a sequence of RGB image frames), and position sensors to acquire positioning information. For the positioning information, some implementations include a visual inertial odometry (VIO) system to determine equivalent odometry information using sequential camera images (e.g., light intensity data) to estimate the distance traveled. Alternatively, some implementations of the present disclosure may include a SLAM system (e.g., position sensors). The SLAM system may include a 3D laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location. The SLAM system may further be a visual SLAM system that relies on light intensity image data to estimate the position and orientation of the camera and/or the device.

In an example implementation, the environment 800 further includes an object detection instruction set 810 that is configured with instructions executable by a processor to analyze the image information and identify objects within the image data. For example, the object detection instruction set 810 analyzes RGB images from a light intensity camera with a sparse depth map from a depth camera (e.g., time-of-flight sensor) and other sources of physical environment information (e.g., camera positioning information from a camera's SLAM system, VIO, or the like such as position sensors) to identify objects (e.g., furniture, appliances, statues, wall structures, etc.) in the sequence of light intensity images (e.g., room scanning data 802) and generate object detection data 812. The object detection data 812 includes the identified objections (e.g., table 815, chair 816, chair 817, and cup 818) and the positions of those objects within the room scanning data 802. In some implementations, the object detection instruction set 810 uses machine learning methods for object identification. In some implementations, a machine learning method includes a machine learning model that is a neural network (e.g., an artificial neural network), decision tree, support vector machine, Bayesian network, or the like. For example, the object detection instruction set 810 uses an object detection neural network unit to identify objects and/or an object classification neural network to classify each type of object.

In an example implementation, the environment 800 further includes a scene graph generation instruction set 820 that is configured with instructions executable by a processor to generate a scene graph for the object detection and room scanning data received. For example, the scene graph generation instruction set 820 obtains room scanning data 802 and object detection data 812 and generates scene graph data 822. For example, the scene graph generation instruction set 820 analyzes room scanning data 802 for a particular room (e.g., a dining room as illustrated in image 804) and object detection data 812 and generates a corresponding scene graph for that particular room (e.g., scene graph 824). Thus, the scene graph data 822 includes a generated scene graph 824 for each room included in the room scanning data 802 and associated object detection data 812. The generation of scene graphs is described herein with reference to FIG. 2.

In some implementations, the environment 800 includes a refinement instruction set 830 that is configured with instructions executable by a processor to obtain and assess the scene graph data 822 from the scene graph generation instruction set 820, the room scanning data 802, and alignment rules from the alignment rules database 834, and generate refinement data 832 to present a refined 3D representation (if needed). In some implementations, the set of views is displayed on the device display 850 of a device (e.g., device 110 of FIG. 1). In some implementations, as illustrated in the example generated environment 834, refinement instruction set 830 generates refinement data 832 (e.g., example operating environment 300 of FIG. 3). For example, if a user is wearing an HMD, a user may be looking at his or her own dining room (e.g., pass-through video or a 3D representation), and the 3D representation that is shown is refined and the cup (e.g., a virtual cup) is on of the table at area 836, where the original 3D representation of the cup was floating above the table.

Figure 9:
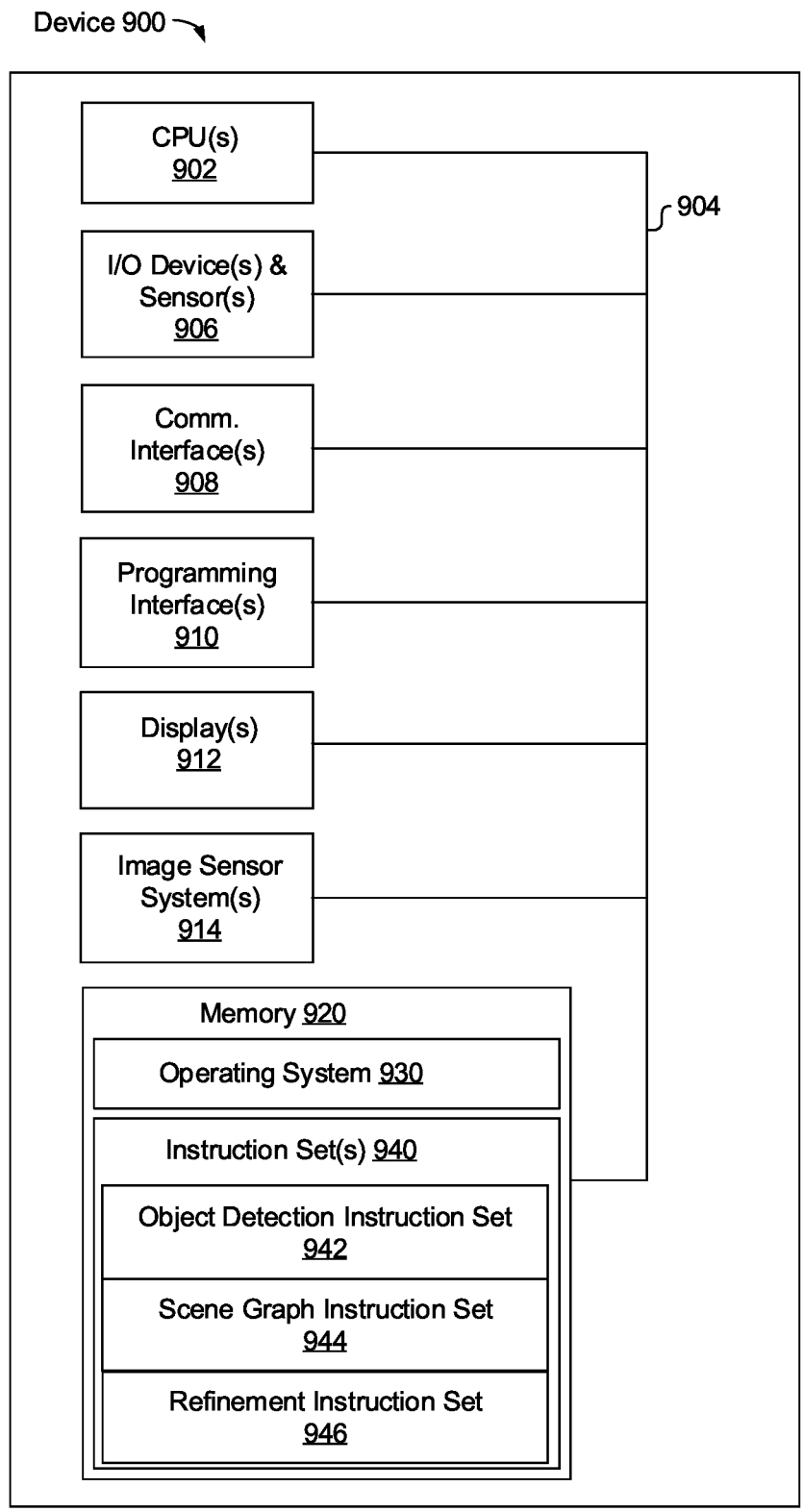
FIG. 9 is an example electronic device in accordance with some implementations.

FIG. 9 is a block diagram of an example device 900. Device 900 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 910, one or more displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present a view of a physical environment or a graphical environment to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 912 correspond to diffractive, reflective, polarized, holographic, etc. waveguide displays. In one example, the device 900 includes a single display. In another example, the device 900 includes a display for each eye of the user.

In some implementations, the one or more image sensor systems 914 are configured to obtain image data that corresponds to at least a portion of the physical environment 105. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

In some implementations, the device 110 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 10 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 110.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a object detection instruction set 942, a scene graph instruction set 944, and a refinement instruction set 946. The instruction set(s) 940 may be embodied as a single software executable or multiple software executables.

The object detection instruction set 942 (e.g., object detection instruction set 810 of FIG. 8) is executable by the processing unit(s) 902 to generate object detection data. For example, the object detection instruction set 942 obtains room scanning data (image sensor data) and detects positions of a set of objects (e.g., chairs, tables, cups, wall structures, etc.) in the physical environment based on the 3D representation for the particular room that is scanned.

The scene graph instruction set 944 is configured with instructions executable by a processor to generate a scene graph data. For example, the scene graph instruction set 944 can assess the object detection data from the object detection instruction set 942 and the room scanning data to generate a scene graph for the 3D representation of the physical environment.

The refinement instruction set 946 is configured with instructions executable by a processor to assess the room scanning data, scene graph data from the scene graph instruction set 944, and the alignment rules from a alignment rules database, and generate refinement data to present an updated/refined representation (if necessary). In some implementations, the refinement instruction set 946 generates display data that includes a 3D representation of the physical environment. For example, if a user is wearing an HMD, a user may be looking at his or her own dining room (e.g., pass-through video or a 3D representation), and the 3D representation that is shown is refined and the cup (e.g., a virtual cup) is on of the table at area 836, where the original 3D representation of the cup was floating above the table.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device having a processor:
obtaining a three-dimensional (3D) representation of a physical environment that was generated based on sensor data obtained during a scanning process;
detecting positions of a set of objects in the physical environment based on the 3D representation;
generating a scene graph for the 3D representation of the physical environment based on the detected positions of the set of objects and the sensor data, wherein the scene graph represents the set of objects and relationships between the objects; and
determining a refined 3D representation of the physical environment by refining the position of at least one object in the set of objects based on the scene graph and an alignment rule associated with a relationship in the scene graph.

2. The method of claim 1, wherein refining the position of the at least one object is based on an angular position of the at least one object with respect to a wall structure.

3. The method of claim 1, wherein refining the position of the at least one object is based on a position of the at least one object with respect to a different object.

4. The method of claim 1, wherein the set of objects is a first set of objects, the method further comprising:
detecting positions of a second set of objects in the physical environment based on the 3D representation;
updating the scene graph for the 3D representation of the physical environment based on the detected positions of the second set of objects; and
determining, based on the updated scene graph, that the second set of objects is a reflection of at least a portion of the first set of objects.

5. The method of claim 1, wherein the 3D representation is associated with 3D semantic data that includes a 3D point cloud that includes semantic labels associated with at least a portion of 3D points within the 3D point cloud.

6. The method of claim 5, wherein the semantic labels identify walls, wall attributes, objects, and classifications of the objects of the physical environment.

7. The method of claim 5, wherein a neural network is trained to:
refine the accuracy of identified alignments of the set of objects based on the positions and the 3D semantic data associated with each respective object in the set of objects; and
output the refined 3D representation of the physical environment based on the refined accuracy of the identified alignments of the set of objects.

8. The method of claim 1, wherein the 3D representation is an extended reality (XR) experience that is presented to a user.

9. The method of claim 1, wherein the sensor data comprises depth data and light intensity image data obtained during the scanning process.

10. The method of claim 1, wherein the electronic device is a head-mounted device (HMD).

11. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining a three-dimensional (3D) representation of a physical environment that was generated based on sensor data obtained during a scanning process;
detecting positions of a set of objects in the physical environment based on the 3D representation;
generating a scene graph for the 3D representation of the physical environment based on the detected positions of the set of objects and the sensor data, wherein the scene graph represents the set of objects and relationships between the objects; and determining a refined 3D representation of the physical environment by refining the position of at least one object in the set of objects based on the scene graph and an alignment rule associated with a relationship in the scene graph.

12. The device of claim 11, wherein refining the position of the at least one object is based on an angular position of the at least one object with respect to a wall structure.

13. The device of claim 11, wherein refining the position of the at least one object is based on a position of the at least one object with respect to a different object.

14. The device of claim 11, wherein the set of objects is a first set of objects, and wherein the non-transitory computer-readable storage medium comprises program instructions that, when executed on the one or more processors, further cause the one or more processors to perform operations comprising:
detecting positions of a second set of objects in the physical environment based on the 3D representation;
updating the scene graph for the 3D representation of the physical environment based on the detected positions of the second set of objects; and
determining, based on the updated scene graph, that the second set of objects is a reflection of at least a portion of the first set of objects.

15. The device of claim 11, wherein the 3D representation is associated with 3D semantic data that includes a 3D point cloud that includes semantic labels associated with at least a portion of 3D points within the 3D point cloud.

16. The device of claim 15, wherein the semantic labels identify walls, wall attributes, objects, and classifications of the objects of the physical environment.

17. The device of claim 15, wherein a neural network is trained to:
refine the accuracy of identified alignments of the set of objects based on the positions and the 3D semantic data associated with each respective object in the set of objects; and
output the refined 3D representation of the physical environment based on the refined accuracy of the identified alignments of the set of objects.

18. The device of claim 11, wherein the device is a head-mounted device (HMD).

19. The device of claim 11, wherein the sensor data comprises depth data and light intensity image data obtained during the scanning process.

20. A non-transitory computer-readable storage medium, storing program instructions executable by one or more processors of an electronic device to perform operations comprising:
- obtaining a three-dimensional (3D) representation of a physical environment that was generated based on sensor data obtained during a scanning process;
- detecting positions of a set of objects in the physical environment based on the 3D representation;
- generating a scene graph for the 3D representation of the physical environment based on the detected positions of the set of objects and the sensor data, wherein the scene graph represents the set of objects and relationships between the objects; and
- determining a refined 3D representation of the physical environment by refining the position of at least one object in the set of objects based on the scene graph and an alignment rule associated with a relationship in the scene graph.

* * * * *